United States Patent
Taniguchi

(10) Patent No.: US 7,409,187 B2
(45) Date of Patent: Aug. 5, 2008

(54) POSITIONING SYSTEM, TERMINAL DEVICE, CONTROL METHOD OF TERMINAL DEVICE, CONTROL PROGRAM OF TERMINAL DEVICE, AND COMPUTER READABLE RECORDING MEDIUM RECORDING CONTROL PROGRAM OF TERMINAL DEVICE

(75) Inventor: Seiichi Taniguchi, Asahi-mura (JP)

(73) Assignee: Seiko Epson Corporation, Tokyo (JP)

( * ) Notice: Subject to any disclaimer, the term of this patent is extended or adjusted under 35 U.S.C. 154(b) by 195 days.

(21) Appl. No.: 11/346,202

(22) Filed: Feb. 3, 2006

(65) Prior Publication Data

US 2006/0178107 A1 Aug. 10, 2006

(51) Int. Cl.
- H04B 7/185 (2006.01)
- G01S 3/02 (2006.01)
- H01Q 15/00 (2006.01)

(52) U.S. Cl. .................. 455/12.1; 455/456.5; 342/457

(58) Field of Classification Search ................ 370/328; 455/12.1, 427, 456, 440, 457; 342/357.01, 342/357.12, 126, 250, 357.08, 357.06, 357.09, 342/457, 47.06; 340/989, 825.36, 539.13, 340/993, 426.19, 825.49

See application file for complete search history.

(56) References Cited

U.S. PATENT DOCUMENTS

| | | | |
|---|---|---|---|
| 5,982,324 A | 11/1999 | Watters et al. | |
| 6,108,553 A * | 8/2000 | Silventoinen et al. | 455/456.3 |
| 6,236,359 B1 | 5/2001 | Watters et al. | |
| 6,353,412 B1 * | 3/2002 | Soliman | 342/387 |
| 6,941,145 B2 * | 9/2005 | Ogino et al. | 455/456.1 |
| 6,950,661 B2 * | 9/2005 | Watanabe et al. | 455/456.1 |
| 7,027,918 B2 * | 4/2006 | Zimmerman et al. | 701/213 |
| 7,139,225 B2 * | 11/2006 | Farmer | 368/46 |
| 2001/0002822 A1 | 6/2001 | Watters et al. | |
| 2002/0080064 A1 | 6/2002 | Kim | |
| 2004/0021602 A1 * | 2/2004 | Weckstrom et al. | 342/427 |
| 2004/0092275 A1 * | 5/2004 | Krasner et al. | 455/502 |
| 2004/0174297 A1 * | 9/2004 | Cho | 342/357.14 |
| 2004/0203853 A1 * | 10/2004 | Sheynblat | 455/456.1 |
| 2006/0290565 A1 * | 12/2006 | Terashi et al. | 342/357.08 |
| 2007/0080857 A1 * | 4/2007 | Gobara | 342/357.12 |
| 2007/0085733 A1 * | 4/2007 | Ikeda | 342/357.1 |

FOREIGN PATENT DOCUMENTS

| | | |
|---|---|---|
| JP | 11252632 A | 9/1999 |
| JP | 2002031675 A | 1/2002 |
| JP | 2003513291 A | 4/2003 |

* cited by examiner

Primary Examiner—Thomas H. Tarcza
Assistant Examiner—Harry Liu
(74) Attorney, Agent, or Firm—Gerald IP Counselors, LLP

(57) ABSTRACT

A communication base station has: base station position information storing means; signal electric wave for communication with sending time information generating means; satellite time information generating means; time difference information generating means for generating the time difference information indicating a time difference between the sending time and the satellite time at the sending time; signal electric wave for communication sending means; and base station information sending means for sending the base station position information and the time difference information; and a terminal device has: terminal side satellite time information generating means; base station information acquisition means; above satellite number decision means; satellite signal positioning means; signal electric wave for communication receiving means; receiving time information generating means; signal electric wave for communication positioning means; combined positioning means, and positioning means, and so on.

7 Claims, 7 Drawing Sheets

FIG. 7

| | BASE STATION POSITIONING METHOD |
|---|---|
| (a) | POSITION OF BASE STATION 20A:(X1,Y1,Z1)<br>POSITION OF BASE STATION 20B:(X2,Y2,Z2)<br>POSITION OF BASE STATION 20C:(X3,Y3,Z3) |
| (b) | TRANSMISSION TIME OF SIGNAL S1 FROM BASE STATION 20A TO TERMINAL 50:tb01<br>TRANSMISSION TIME OF SIGNAL S2 FROM BASE STATION 20B TO TERMINAL 50:tb02<br>TRANSMISSION TIME OF SIGNAL S3 FROM BASE STATION 20C TO TERMINAL 50:tb03 |
| (c) | t1:SENDING TIME OF SIGNAL S1<br>t2:SENDING TIME OF SIGNAL S2<br>t3:SENDING TIME OF SIGNAL S3 |
| (d) | ta1: TIME DIFFERENCE OF BASE STATION 20A<br>ta2: TIME DIFFERENCE OF BASE STATION 20B<br>ta3: TIME DIFFERENCE OF BASE STATION 20C |
| (e) | C: TRANSMISSION SPEED OF SIGNALS S1, S2, S3 (SPEED OF LIGHT) |
| (f) | td01: TIME DIFFERENCE BETWEEN SENDING TIME OF SIGNAL S1<br>AND TIME WHEN TERMINAL 50 RECEIVES SIGNAL S1<br>td02: TIME DIFFERENCE BETWEEN SENDING TIME OF SIGNAL S2<br>AND TIME WHEN TERMINAL 50 RECEIVES SIGNAL S2<br>td03: TIME DIFFERENCE BETWEEN SENDING TIME OF SIGNAL S3<br>AND TIME WHEN TERMINAL 50 RECEIVES SIGNAL S3 |
| (g) | t0: TIME WHEN TERMINAL 50 RECEIVES SIGNALS S1, S2, S3 |
| (h) | (X, Y, Z): POSITION OF TERMINAL 50 |
| (i) | EQUATION (1): $(X-X1)^2+(Y-Y1)^2+(Z-Z1)^2=(tb01 \times C)^2$<br>EQUATION (2): $(X-X2)^2+(Y-Y2)^2+(Z-Z2)^2=(tb02 \times C)^2$<br>EQUATION (3): $(X-X3)^2+(Y-Y3)^2+(Z-Z3)^2=(tb03 \times C)^2$ |
| (j) | EQUATION (4): $t1=ta1+tgps$<br>EQUATION (5): $t2=ta2+tgps$<br>EQUATION (6): $t3=ta3+tgps$ |
| (k) | EQUATION (7): $td01=(t1+tb01)-t0=(ta1+tgps+tb01)-t0$<br>EQUATION (8): $td02=(t2+tb02)-t0=(ta2+tgps+tb02)-t0$<br>EQUATION (9): $td03=(t1+tb03)-t0=(ta3+tgps+tb03)-t0$ |
| | UNKNOWN NUMBERS: X,Y,Z,tb01,tb02,tb03<br>SIX UNKNOWN NUMBERS CAN BE OBTAINED BY SOLVING EQUATIONS<br>(1), (2), (3), (7), (8), AND (9) SIMULTANEOUSLY |

POSITIONING SYSTEM, TERMINAL DEVICE, CONTROL METHOD OF TERMINAL DEVICE, CONTROL PROGRAM OF TERMINAL DEVICE, AND COMPUTER READABLE RECORDING MEDIUM RECORDING CONTROL PROGRAM OF TERMINAL DEVICE

This application claims the priorities benefit under 35 U.S.C. § 119 of Japanese Patent Application No. 2005-029422 filed on Feb. 4, 2005, which is hereby incorporated in its entirety by reference.

BACKGROUND

1. Technical Field

The present invention relates to a positioning system in a communication network of an inter-base station asynchronous system without a common reference timing such as the same clock between communication base stations, a terminal device, a control method of terminal device, a control program of a terminal device, and a computer readable recording medium recording the control program of the terminal device.

2. Related Art

In the past, for example, in a so-called digital mobile communication system in a CDMA (Code Division Multiple Access) system, a method of detecting a position using an arrival time difference of a receiving signal between a plurality of base stations and a mobile wireless terminal devices relying on the assumption that a clock synchronization is assured among the plural base stations was known (for example, JP A-7-181242).

However, in order to establish a system for synchronizing a clock among respective base stations which are numerously located across the country, there is a problem that an economic burden is serious.

Correspondingly, a technology has been proposed, wherein a position management station to manage the mutual time difference information of a plurality of base stations is provided in a communication network of an inter-base station asynchronous system and this position management station measures the position of a mobile terminal (for example, JP A-11-252632).

However, according to the related art technology, the large-scale system change is required in the system to obtain a arrival time difference between a timing signal which has been sent from each base station and a timing signal which is received from other base station and this causes a high economic burden in its establishment.

Further, this involves a problem that the position of the mobile terminal cannot be positioned in the case that the signals cannot be received from three or more base stations.

SUMMARY

Therefore, an advantage of some aspects of the invention is to provide a positioning system in a communication network of an inter-base station asynchronous system not requiring the large-scale system change of the communication base station and capable of measuring the mobile terminal even in the case that signals cannot be received from three or more base stations, a terminal device, a control method of a terminal device, a control program of a terminal device, and a computer readable recording medium recording a control program of a terminal device.

According to a first aspect of the invention, the advantage can be attained by a positioning system of an inter-communication base station asynchronous system containing a plurality of communication base stations and a terminal device capable of communication with the communication base stations. The communication base station has base station position information storing means for storing base station position information indicating a position of the communication base station; signal electric wave for communication with the sending time information generating means for putting the sending time information indicating a sending time on a signal electric wave for communication to be sent from the communication base station; satellite time information generating means for generating the satellite time information indicating a satellite time that is a time of a positioning satellite on the basis of a satellite signal that is a signal from the positioning satellite; time difference information generating means for generating the time difference information indicating a time difference between the sending time and the satellite time at the sending time; signal electric wave for communication sending means for sending the signal electric wave for communication on which the sending time information is put; and base station information sending means for sending the base station position information and the time difference information; and the terminal device has terminal side satellite time information generating means for generating terminal side satellite time information indicating a satellite time that is a time of the positioning satellite on the basis of the satellite signal from the positioning satellite; base station information acquisition means for acquiring the base station position information and the time difference information from the communication base station; above satellite number decision means for deciding a number of above satellites that are the positioning satellites located in the sky above the terminal device; satellite signal positioning means for positioning a position of the terminal device on the basis of the satellite signal; signal electric wave for communication receiving means for receiving the signal electric wave for communication from the communication base station; receiving time information generating means for generating the receiving time information indicating a time receiving the signal electric wave for communication; signal electric wave for communication positioning means for positioning a position of the terminal device on the basis of the base station position information, the time difference information, the sending time information, and the receiving time information; combined positioning means for positioning a position of the terminal device on the basis of the satellite signal, the base station position information, the time difference information, the sending time information, and the receiving time information; and positioning means selection means for selecting any of the satellite signal positioning means, the signal electric wave for communication positioning means, and the combined positioning means on the basis of the number of the above satellite.

According to the configuration of the first aspect of the invention, the communication base station can generate the satellite time information by the satellite time information generating means. It is well known that the present position is positioned on the basis of the plural satellite signals and as a result, the accurate satellite time can be acquired together with the positioning position information.

Then, the communication base station can generate the time difference information by the time difference information generating means.

In other words, the communication base station does not synchronize the transmission time with the satellite time but it only generates the time difference information, so that the structure of the communication base station is simple and it does not require the large-scale system change of the communication base station.

On the other hand, the terminal device can obtain the base station position information and the time difference information from the communication base station by the base station information acquisition means.

In addition, the terminal device can receive the signal electric wave for communication from the communication base station by the signal electric wave for communication receiving means.

Then, the receiving time information can be generated by the receiving time information generating means. In this case, the terminal device can generate the satellite time information by the terminal side satellite time information generating means and this makes it possible to eliminate the difference between the receiving time information and the satellite time.

Further, in the case that the base station position information and the time difference information can be received form three or more communication base stations and the signal electric wave for communication can be received from these three or more communication base stations, it is possible to accurately calculate a transmission time till the signal electric wave for communication arrives from each communication base station to the terminal device. Therefore, positioning is possible by the signal electric wave for communication positioning means.

However, in the case that the signal electric wave for communication only can be received from 0 to two communication base stations, it is not possible for the signal electric wave for communication positioning means to position the position of the terminal device.

On this point, since the terminal device has the combined positioning means and the satellite signal positioning means, if the signal electric wave for communication can only be received from 0 to two communication base stations, the terminal device can carry out positioning on the basis of the signal electric wave for communication and the satellite signal or only on the basis of a plurality of the satellite signals.

Therefore, the terminal device can carry out positioning even in the case that the signal cannot be received from three or more communication base stations.

Thereby, according to the configuration of the invention, without requiring the large-scale system change of the communication base station, it is possible to carry out the positioning even in the case that the signal cannot be received from three or more communication base stations.

According to a second aspect of the invention, the advantage can be attained by a terminal device that can receive a signal electric wave for communication on which sending time information indicating a sending time is put from a plurality of communication base stations in a communication network of an inter-communication base station asynchronous system, containing: terminal side satellite time information generating means for generating the terminal side satellite time information indicating a satellite time that is a time of a positioning satellite on the basis of satellite signal from the positioning satellite; base station information acquisition means for acquiring base station position information indicating a position of the communication base station and time difference information indicating a time difference between the sending time and the satellite time at the sending time from the communication base station; above satellite number decision means for deciding a number of the above satellites that are the positioning satellites located in the sky above the terminal device; satellite signal positioning means for positioning a position of the terminal device on the basis of the satellite signal; signal electric wave for communication receiving means for receiving the signal electric wave for communication from the communication base station; receiving time information generating means for generating receiving time information indicating a time receiving the signal electric wave for communication; signal electric wave for communication positioning means for positioning a position of the terminal device on the basis of the base station position information, the time difference information, the sending time information, and the receiving time information; combined positioning means for positioning a position of the terminal device on the basis of the satellite signal, the base station position information, the time difference information, the sending time information, and the receiving time information; and positioning means selection means for selecting any of the satellite signal positioning means, the signal electric wave for communication positioning means, and the combined positioning means on the basis of the number of the above satellite.

According to the configuration of the second aspect of the invention, similarly to the configuration of the first aspect, the large-scale system change of the base station is not required and even in the case that the signal cannot be received from the three or more base stations, it is possible to position the terminal device.

A third aspect of the invention, in the structure of the second aspect of the invention, may provide the terminal device, in which the positioning means selection means selects the satellite signal positioning means in the case that the number of the above satellites is three or more; selects the combined positioning means in the case that the number of the above satellites is one or two; and selects the signal electric wave for communication positioning means in the case that the number of the above satellites is zero.

Generally, the accuracy of positioning on the basis of the satellite signal is higher than that of positioning on the basis of the signal electric wave for communication.

In this regard, the positioning means selection means of the terminal device is configured so as to select the satellite signal positioning means when the number of above satellites is three or more; select the combined positioning means when the number of above satellites is one or two; and select the signal electric wave for communication positioning means when the number of above satellites is zero. Therefore, as long as the satellite signal can be received from the positioning satellite, the positioning is possible only on the basis of the satellite signal or on the basis of both of the satellite signal and the signal electric wave for communication.

As a result, the terminal device can be positioned at the highest degree of accuracy of positioning in accordance with the number of the above satellites.

A fourth aspect of the invention, according to the configuration of the second aspect of the invention or the third aspect of the invention may provide the terminal device containing base station switching decision means for deciding if the all or a part of the communication base stations capable of communication are or is switched; wherein the base station information acquisition means acquires the base station position information and the time difference information on the basis of a decision result of the base station switching decision means.

In the case that the all or apart of the communication base stations capable of communication are or is switched, the all or a part of the base station position information and the time difference information that has been held before switching cannot be used for positioning by the signal electric wave for communication positioning means and the combined positioning means.

In this regard, according to the configuration of the fourth aspect of the invention, since the terminal device has the base station switching decision means, it is possible to decide if the all or a part of the communication base stations capable of communication are or is switched or not.

Then, the base station information acquisition means is configured so as to acquire the base station position information and the time difference information on the basis of a decision result of the base station switching decision means, so that after the communication base stations capable of communication is switched, newly acquiring the base station position information and the time difference information, the positioning can be carried out by means of the signal electric wave for communication positioning means and the combined positioning means.

According to a fifth aspect of the invention, the advantage can be attained by a control method of a terminal device, comprising: generating satellite time information indicating a satellite time that is a time of a positioning satellite on the basis of a satellite signal that is a signal from the positioning satellite by means of the terminal device capable of communication with a plurality of communication base stations; receiving base station position information indicating a position of the communication base station and time difference information indicating a time difference between a sending time and the satellite time at the sending time when the communication base station sends a signal electric wave for communication, from the communication base station by means of the terminal device; deciding a number of the above satellites that are the positioning satellites located in the sky above the terminal device by means of the terminal device; and selecting one from among satellite signal positioning means for positioning a position of the terminal device on the basis of the satellite signal; signal electric wave for communication positioning means for positioning a position of the terminal device on the basis of the base station position information, the time difference information, the sending time information, and a receiving time information indicating a time receiving the signal electric wave for communication; and combined positioning means for positioning a position of the terminal device on the basis of the satellite signal, the base station position information, the time difference information, the sending time information, and the receiving time information; on the basis of a decision result in the above satellite number decision step, by means of the terminal device.

According to the configuration of the fifth aspect of the invention, similarly to the first aspect of the invention, without requiring the large-scale system change of the communication base station, it is possible to position the terminal device even in the case that the signal cannot be received from three or more communication base stations.

According to a sixth aspect of the invention, the advantage can be attained by a control program making a computer to execute the steps of: generating satellite time information indicating a satellite time that is a time of a positioning satellite on the basis of a satellite signal that is a signal from the positioning satellite by means of a terminal device capable of communication with a plurality of communication base stations; receiving base station position information indicating a position of the communication base station and time difference information indicating a time difference between a sending time and the satellite time at the sending time when the communication base station sends a signal electric wave for communication, from the communication base station by means of the terminal device; deciding a number of the above satellites that are the positioning satellites located in the sky above the terminal device by means of the terminal device; and selecting one from among satellite signal positioning means for positioning a position of the terminal device on the basis of the satellite signal; signal electric wave for communication positioning means for positioning a position of the terminal device on the basis of the base station position information, the time difference information, the sending time information, and receiving time information indicating a time receiving the signal electric wave for communication; and combined positioning means for positioning a position of the terminal device on the basis of the satellite signal, the base station position information, the time difference information, the sending time information, and the receiving time information; on the basis of a decision result in the above satellite number decision step by means of the terminal device.

According to a seventh aspect of the invention, the advantage can be attained by a computer readable recording medium recording a control program of a terminal device making a computer to execute the steps of: generating satellite time information indicating a satellite time that is the time of a positioning satellite on the basis of a satellite signal that is a signal from the positioning satellite by means of the terminal device capable of communication with a plurality of communication base stations; receiving base station position information indicating a position of the communication base station and time difference information indicating a time difference between sending time and the satellite time at a sending time when the communication base station sends a signal electric wave for communication, from the communication base station by means of the terminal device; deciding a number of the above satellites that are the positioning satellites located in the sky above the terminal device by means of the terminal device; and selecting one from among satellite signal positioning means for positioning a position of the terminal device on the basis of the satellite signal; signal electric wave for communication positioning means for positioning a position of the terminal device on the basis of the base station position information, the time difference information, the sending time information, and receiving time information indicating a time receiving the signal electric wave for communication; and combined positioning means for positioning a position of the terminal device on the basis of the satellite signal, the base station position information, the time difference information, the sending time information, and the receiving time information; on the basis of a decision result in the above satellite number decision step, by means of the terminal device.

BRIEF DESCRIPTION OF THE DRAWINGS

The invention will be described with reference to the accompanying drawings, wherein like numbers reference like elements.

FIG. 5 is a schematic diagram showing a sending frame FR or the like.

FIG. 7 is an explanatory views of an example of a base station positioning method.

DESCRIPTION OF EXEMPLARY EMBODIMENTS

Hereinafter, with reference to the drawings, the exemplary embodiment(s) of this invention will be described in detail.

The following embodiments are given various limitations that are preferable technically because they are the exemplary specific examples of the invention, however, the scope of the invention is not limited to these aspects unless there is a particular description to limit the invention in the following descriptions.

Figure 1:
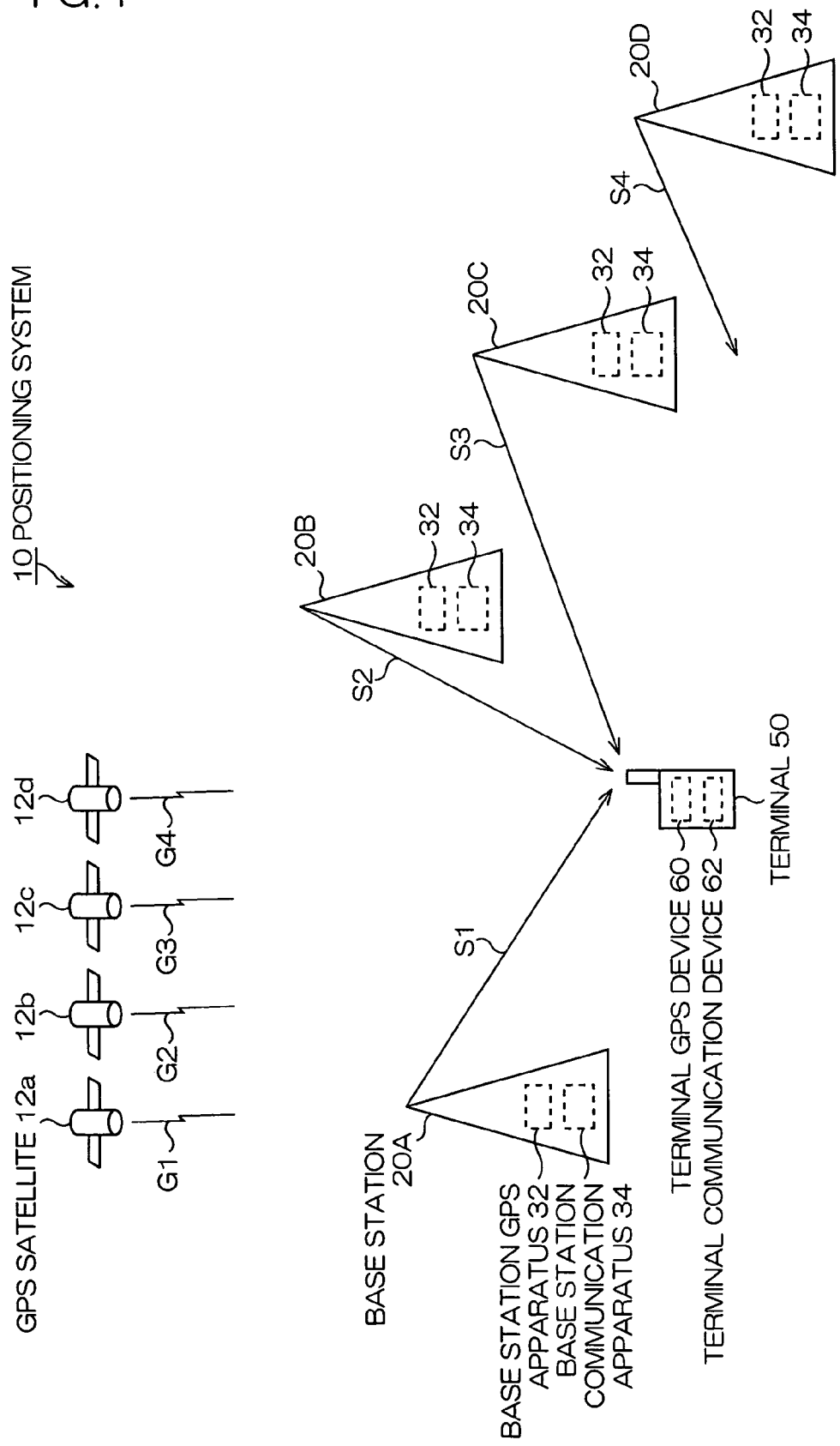
FIG. 1 is a schematic diagram showing a positioning system according to an embodiment of the invention.

FIG. 1 is a schematic diagram showing a positioning system 10 according to an embodiment of the invention.

As shown in FIG. 1, the positioning system 10 has base stations 20A, 20B, 20C, and 20D. Each of these base stations 20A or the like is an example of a plurality of communication base stations.

The positioning system 10 further has a terminal 50 capable of communication with the base station 20A or the like. This terminal 50 is an example of the terminal device.

The base station 20A or the like has a base station GPS apparatus 32 and can receive, for example, signals G1, G2, G3, and G4 from GPS satellites 12a, 12b, 12c, and 12d. GPS satellites 12a, 12b, 12c, and 12d are examples of positioning satellites. Signals G1, G2, G3, and G4 are examples of satellite signals.

The base station 20A or the like has a base station communication apparatus 34 and can send a signal electric wave for communication, for example, signal electric waves S1 (hereinafter, referred to as a signal S1), S2, S3, and S4 to the terminal 50 having a terminal communication device 62.

The base station 20A or the like has no time synchronization mutually and configures a communication network of an inter-base station asynchronous system.

The terminal 50 has a terminal GPS device 60 and can receive the signal G1 or the like from the GPS satellite 12a or the like. For example, the terminal 50 is a cellular phone, a PHS (Personal Handy-phone System), and a PDA (Personal Digital Assistance) or the like, however, the terminal 50 is not limited to these.

Further, differently from the present embodiment, there may be three GPS satellites 12a or the like or there may be five or more GPS satellites 12a or the like. In addition, differently from the present embodiment, there may be five or more base stations 20A or the like and there may be two or more terminals 50.

With respect to the configuration of main hardware of the base station 20A

Figure 2:
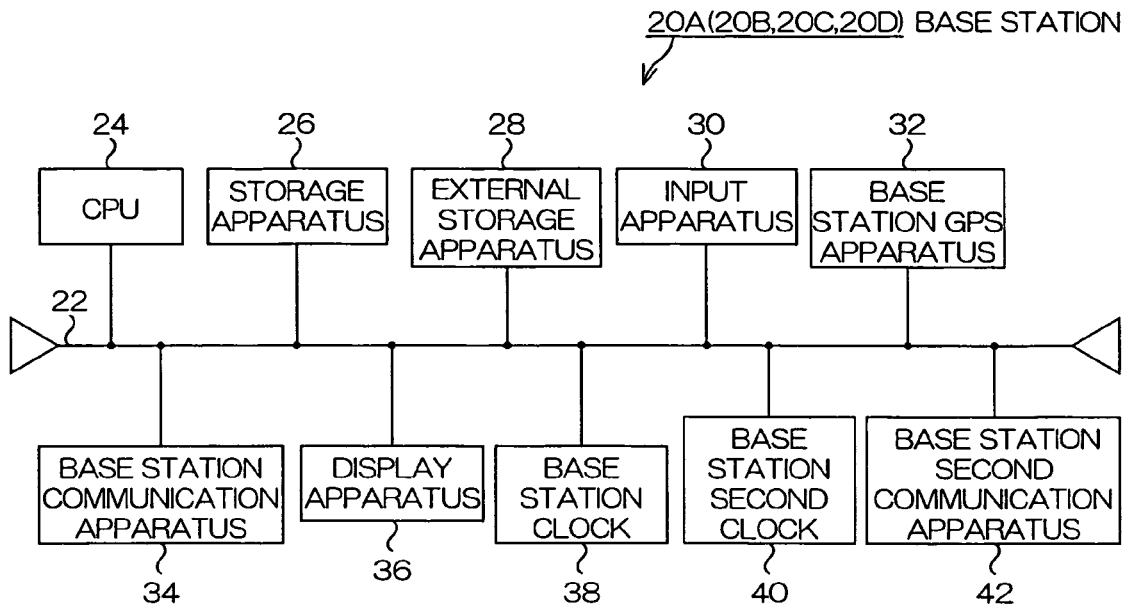
FIG. 2 is a schematic diagram showing the configuration of main hardware of a base station.

FIG. 2 is a schematic diagram showing the configuration of main hardware of the base station 20A.

The structures of main hardware of the base stations 20B, 20C, and 20D are equal to the base station 20A, so that the explanation thereof is herein omitted.

As shown in FIG. 2, the base station 20A has a computer and the computer has a bus 22.

To this bus 22, a CPU (Central Processing Unit) 24, a storage apparatus 26, and an external storage apparatus 28 or the like are connected, respectively. For example, the storage apparatus 26 is a RAM (Random Access Memory), or a ROM (Read Only memory) or the like. For example, the external storage apparatus 28 is an HD (Hard Disk).

In addition, to this bus 22, an input apparatus 30 for inputting various information or the like, a base station GPS apparatus 32, and a base station communication apparatus 34 are connected, respectively. The base station communication apparatus 34 is a constitution for transmitting the signal S1 to communicate with the terminal 50.

In addition, to this bus 22, a display apparatus 36 for displaying various information or the like and a base station clock 38 are connected. The base station clock 38 is not synchronized with the base station clock 38 of the other base station 20B or the like and it is not synchronized with a time of the GPS satellite 12a or the like (hereinafter, referred to as a GPS time).

Further, to this bus 22, a base station second clock 40 is connected. As described later, the time measured by the base station second clock 40 can be maintained that there is no difference between its time and the GPS time.

Further, to this bus 22, a base station second communication apparatus 42 is connected. As described later, the base station second communication apparatus 42 is configured so as to send base station position information 162 and time difference information 160 (refer to FIG. 4).

With respect to the configuration of main hardware of the terminal 50

Figure 3:
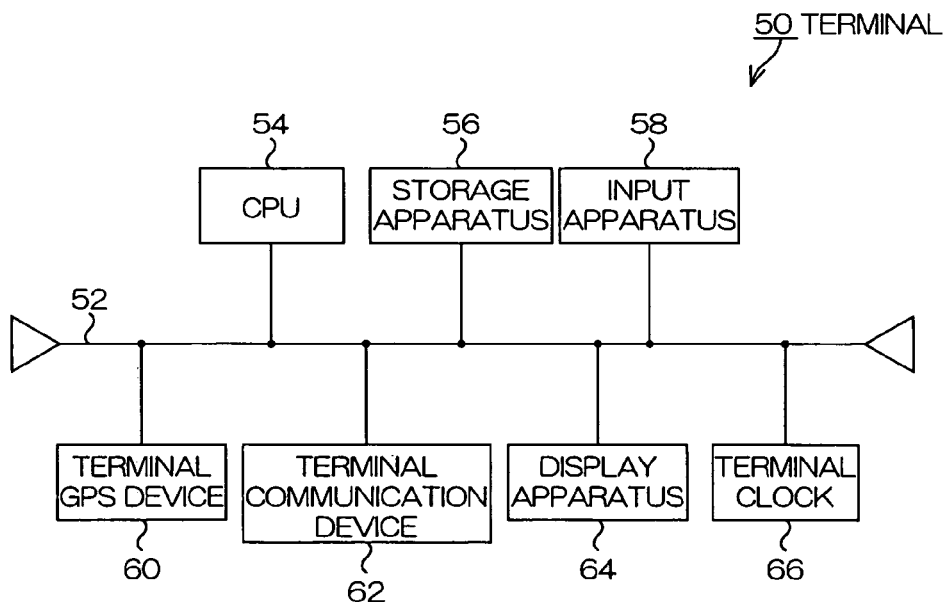
FIG. 3 is a schematic diagram showing the configuration of main software of a terminal.

FIG. 3 is a schematic diagram showing the configuration of main hardware of the terminal 50.

As shown in FIG. 3, the terminal 50 has a computer and the computer has a bus 52.

To this bus 52, a CPU 54, a storage apparatus 56, an input apparatus 58, a terminal GPS device 60, a terminal communication device 62, a display apparatus 64, and a terminal clock 66 are connected. As described later, the time measured by the terminal clock 66 can be maintained that there is no difference between its time and the GPS time.

With respect to the configuration of main software of the base station 20A

Figure 4:
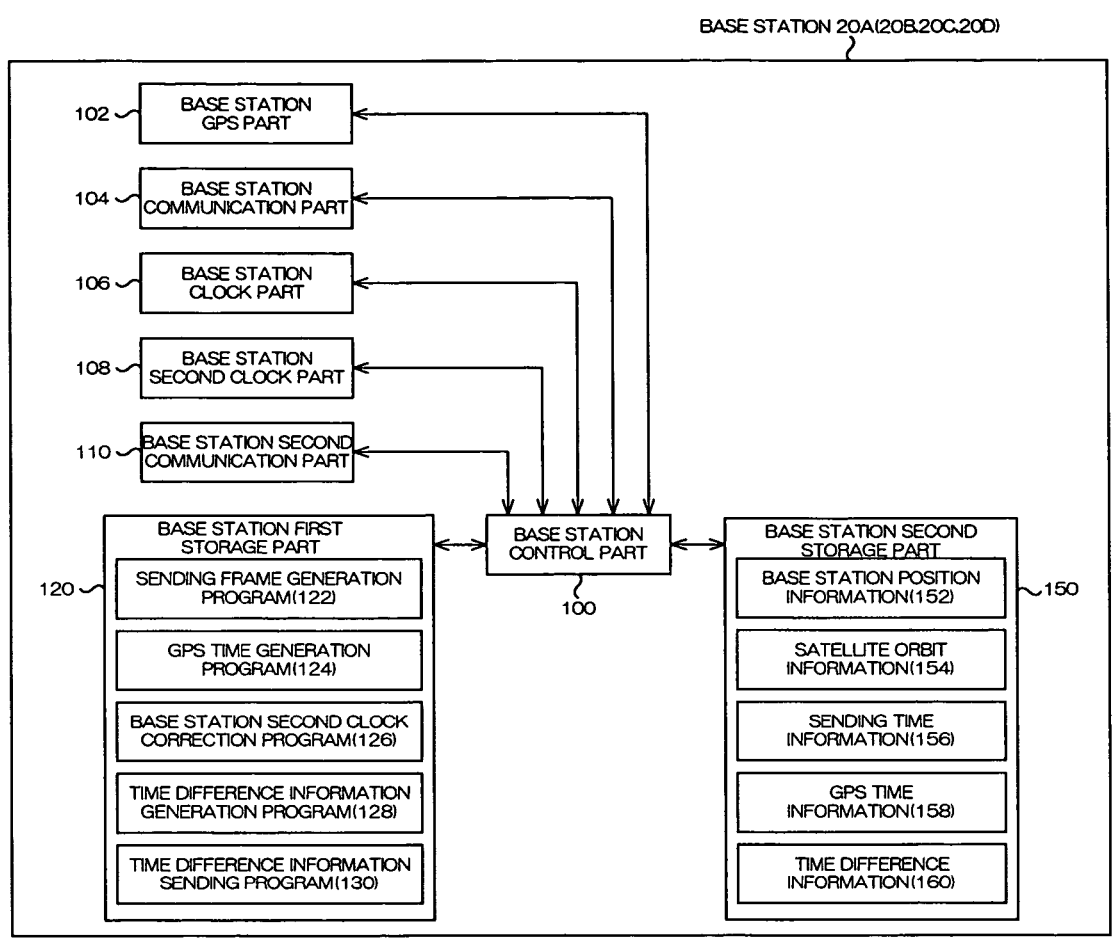
FIG. 4 is a schematic diagram showing the configuration of main software of a base station.

FIG. 4 is a schematic diagram showing the structures of main software of the base station 20A.

Since the configuration of main hardware of the base stations 20B, 20C, and 20D are equal to the base station 20A, the explanation thereof is herein omitted.

As shown in FIG. 4, the base station 20A has a base station control part 100 that controls each part, abase station GPS part 102 that corresponds to the base station GPS apparatus 32 of FIG. 2, and a base station communication part 104 that corresponds to the base station communication apparatus 34 of FIG. 2 or the like. This base station communication part 104 is an example of the signal electric wave for communication sending means, which sends the signal S1.

In addition, the base station 20A has a base station clock part 106 corresponding to the base station clock 38 of FIG. 2, a base station second clock part 108 corresponding to the base station second clock 40 of FIG. 2, and a base station second communication part 110 corresponding to the base station second communication apparatus 42 of FIG. 2 or the like.

The base station 20A further has a base station first storage part 120 that stores various programs and a base station second storage part 150 that stored various information.

As shown in FIG. 4, the base station 20A stores base station position information 152 in the base station second storage part 150. The base station position information 152 is information indicating a position of the base station 20A. For example, the position of the base station 20A is represented by a latitude, a longitude, and an altitude. This base station position information 152 is an example of the base station position information and the base station second storage part 150 is an example of the base station position information storing means.

As shown in FIG. 4, the base station 20A stores the satellite orbit information 154 in the base station second storage part 150. For example, the satellite orbit information 154 includes Almanac that is general orbit information of all of the GPS satellites 12a or the like and Ephemeris that is accurate orbit information of each of the GPS satellites 12a or the like. The satellite orbit information 154 is used for carrying out positioning on the basis of the signal G1 or the like from the GPS satellite 12a or the like.

The base station control part 100 periodically receives the signal G1 or the like from the GPS satellite 12a or the like by the base station GPS part 102 to extract Almanac or Ephemeris from the signal G1 or the like. Almanac is updated, for example, for every seven days and Ephemeris is updated, for example, for every four hours and they are always maintained at a valid condition.

The base station 20A may generate sending time information 156 indicating a sending time of the signal S1. The base station control part 100 may store the sending time information 156 in the base station second storage part 150.

As shown in FIG. 4, the base station 20A may store a sending frame generation program 122 in the base station first storage part 120. The sending frame generation program 122 is a program for the base station control part 100 to put the sending time information 156 on the signal S1. In other words, the sending frame generation program 122 and the base station control part 100 are as a whole an example of the unit signal electric wave for communication with sending time information generating means.

Figure 5:
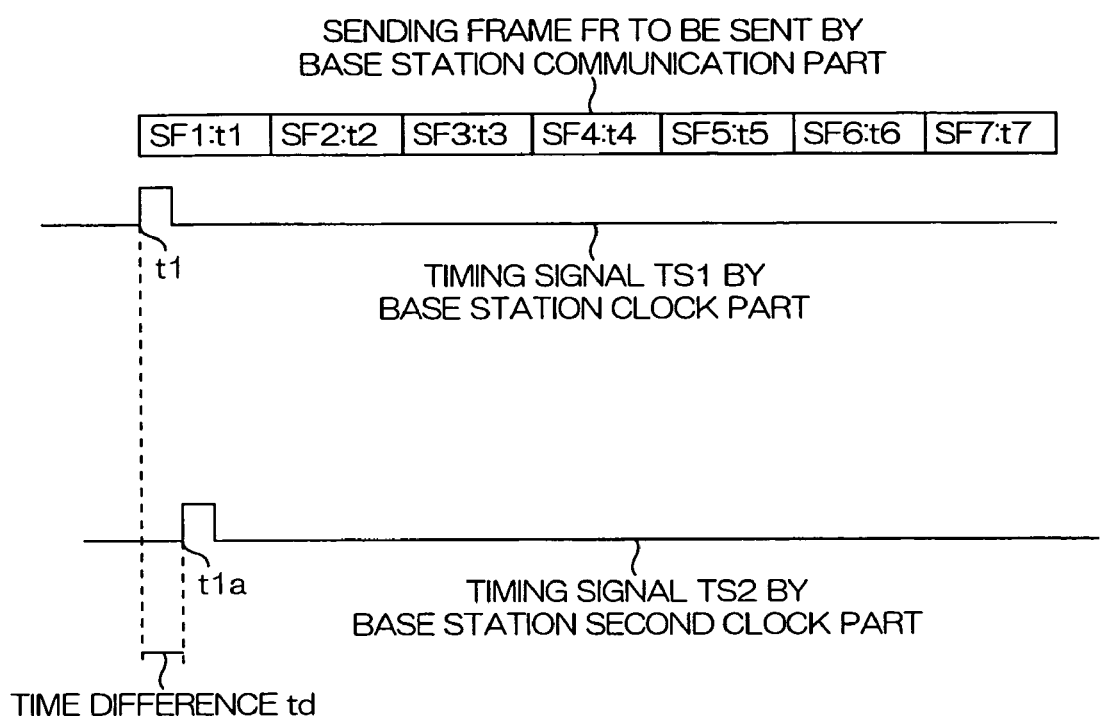

FIG. 5 is a schematic diagram showing an example of a sending frame FR to be put on the signal S1 that is transmitted by the base station communication part 104.

As shown in FIG. 5, for example, the sending frame FR is configured by sub frames SF1 to SF7 and each of the sub frames SF1 or the like may include information indicating sending times t1 to t7 of each of the sub frames SF1 or the like, respectively. The sending time t1 or the like is measured by the base station clock part 106.

The base station 20A may continuously send the signal S1 including a timing signal TS1 by the base station communication part 104.

As shown in FIG. 4, the base station 20A may store a GPS time generation program 124 in the base station first storage part 120. The GPS time generation program 124 is a program for the base station control part 100 to generate GPS time information 158 indicating the GPS time on the basis of the signal G1 or the like from the GPS satellite 12a or the like (refer to FIG. 1). In other words, the GPS time generation program 124 and the base station control part 100 are as a whole an example of the satellite time information generating means.

The base station control part 100 may carry out positioning of the present position on the basis of the plural signals G1 or the like received by the base station GPS part 102 using the satellite orbit information 154 and may generate the accurate GPS time information 158 to store it in the base station second storage part 150.

As shown in FIG. 4, the base station 20A may store a base station second clock correction program 126 in the base station first storage part 120. The base station second clock correction program 126 is a program for the base station control part 100 to maintain the time of the base station second clock part 108 at the condition that there is no difference between this time and the GPS time on the basis of the above-descried GPS time information 158.

Thereby, the base station 20A maintains the time of the base station second storage part 108 at the condition that there is no difference between this time and the GPS time.

As shown in FIG. 4, the base station 20A may store a time difference information generation program 128 in the base station first storage part 120. The time difference information generation program 128 is a program for generating the time difference information 160 indicating a time difference between the sending time indicated by the sending time information 156 and the time generated by the base station second clock part 108 at the sending time of the signal S1. In other words, the time difference information generation program 128 and the base station control part 100 are as a whole an example of the time difference information generating means.

Specifically, as shown in FIG. 5, the base station control part 100 may receive the sending frame FR generated by the base station communication part 104 and may generate the time difference information 160 indicating a time difference td between this sending frame FR and a time t1a of the base station second clock part 108. Specifically, the time difference td is measured depending on a timing difference between a timing signal TS1 generated by the base station clock part 106 and included in the signal S1 and a timing signal TS2 generated by the base station second clock part 108. Here, it is assumed that there is no transmission time of the sending frame FR in the interior of the base station 20A because it is very short.

As described above, since the time of the base station second clock part 108 is maintained at the condition there is no difference between this time and the GPS time, the time difference information 160 indicates the time difference between the sending time t1 and the GPS time.

The base station control part 100 may store the generated time difference information 160 in the base station second storage part 150.

As shown in FIG. 4, the base station 20A may store a time difference information sending program 130 in the base station first storage part 120. The time difference information sending program 130 is a program for the base station control part 100 to send the base station position information 152 and the time difference information 160 to the terminal 50 by the base station second communication part 110. In other words, the time difference information sending program 130, the base station control part 100, and the base station second communication part 110 are as a whole an example of the base station information sending means.

Specifically, the base station control part 100 may put the base station position information 152 and the time difference information 160 on a signal of a different system from the above-described signal S1 to send them in accordance with the request from the terminal 50.

As described above, the base station 20A generates the time difference information 160 and sends the time difference information 160 putting it on the signal of a different system from the signal S1 for communication in accordance with the request of the terminal 50 without synchronizing the sending time measured by the base station clock part 106 with the GPS time. Therefore, its configuration is simple and the large-scale system change is not required in a general communication base station of the inter-base station asynchronous system.

With respect to the configuration of main software of the terminal 50

Figure 6:
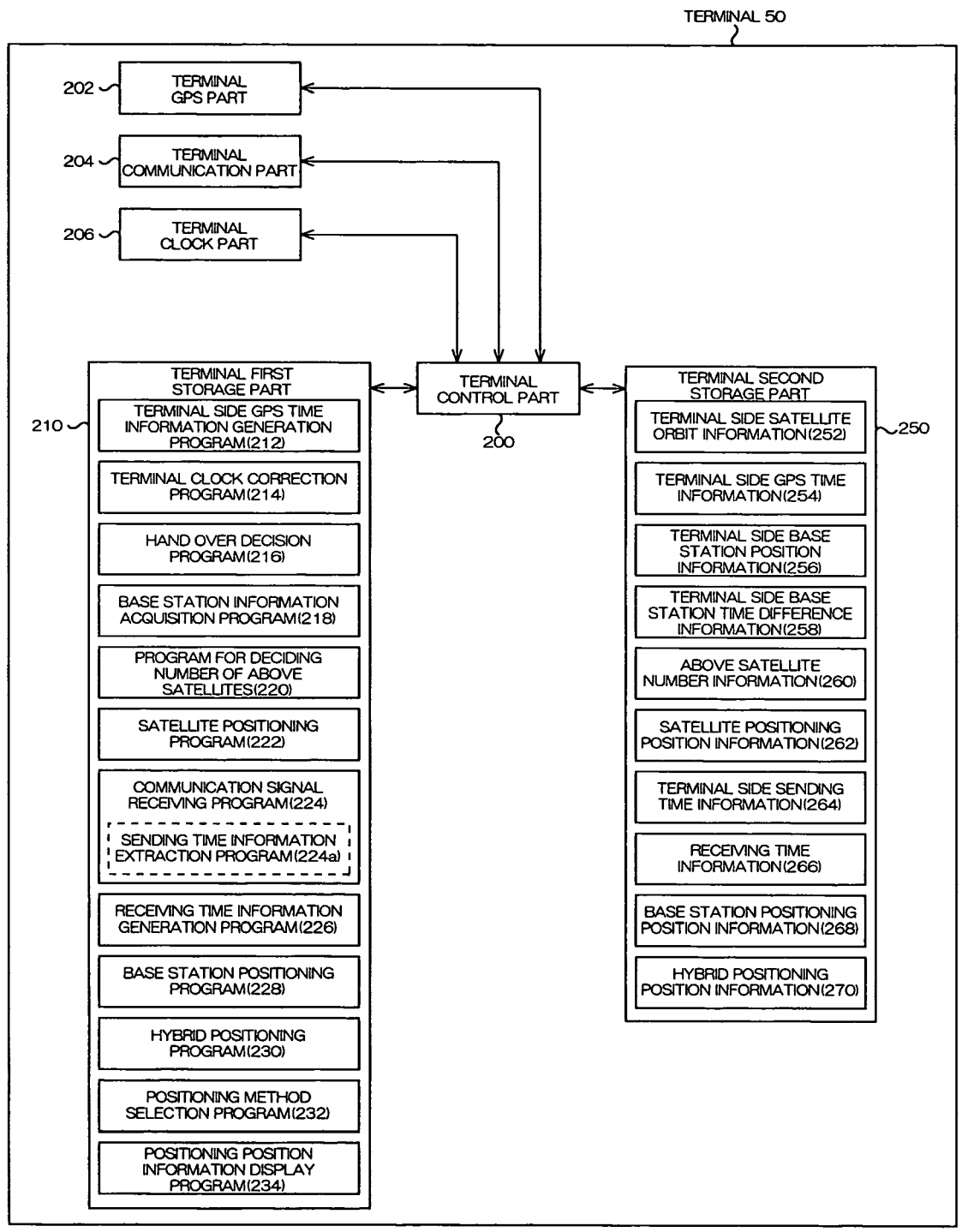
FIG. 6 is a schematic diagram showing the configuration of main software of the terminal.

FIG. 6 is a schematic diagram showing the configuration of main software of the terminal 50.

As shown in FIG. 6, the terminal 50 has a terminal control part 200 for controlling each part, a terminal GPS part 202 corresponding to the terminal GPS device 60 of FIG. 3, a terminal communication part 204 corresponding to the terminal communication device 62 of FIG. 3, and a terminal clock part 206 corresponding to the terminal clock 66 of FIG. 3 or the like.

The terminal 50 also has a terminal first storage part 210 storing various programs therein and a terminal second storage part 250 storing various information therein.

As shown in FIG. 6, the terminal 50 stores terminal side satellite orbit information 252 in the terminal second storage part 250. The terminal side satellite orbit information 252 is, for example, information including Almanac and Ephemeris.

The terminal control part 200 may periodically receive the signal G1 or the like from the GPS satellite 12a or the like by the terminal GPS part 202, may extract Almanac from the signal G1 or the like, for example, for every seven days and may extract Ephemeris, for example, for every four hours. As a result, Almanac and Ephemeris are always maintained at a valid condition.

Further, different from the present embodiment, the terminal control part 200 is allowed to acquire the satellite orbit information 154 (refer to FIG. 4) including Almanac and Ephemeris from the base station 20A by means of the terminal communication part 204.

As shown in FIG. 6, the terminal 50 may store a terminal side GPS time information generation program 212 in the terminal first storage part 210. The terminal side GPS time information generation program 212 is a program for the terminal control part 200 to generate terminal side GPS time information 254 indicting the GPS time on the basis of the signal G1 or the like (refer to FIG. 1) from the GPS satellite 12a or the like. This terminal side GPS time information 254 is an example of the terminal side satellite time information and the terminal side GPS time information generation program 212 and the terminal control part 200 are as a whole an example of the terminal side satellite time information generating means.

As shown in FIG. 6, the terminal 50 may store a terminal clock correction program 214 in the terminal first storage part 210. The terminal clock correction program 214 is a program for the terminal control part 200 to correct the time of the terminal clock part 206 on the basis of the terminal side GPS time information 254.

Thereby, the terminal 50 can eliminate the difference between the time of the terminal clock part 206 and the GPS time.

As shown in FIG. 6, the terminal 50 may store a hand over decision program 216 in the terminal first storage part 210. The hand over decision program 216 is a program for the terminal control part 200 to decide if the all or a part of the base stations 20A or the like (refer to FIG. 1) capable of communication at the present time are or is switched to other base station or not. In other words, the hand over decision program 216 and the terminal control part 200 are as a whole an example of the base station switching decision means.

The hand over means that the base station with which the terminal 50 is capable of communication is switched. For example, this is applicable to the case that the terminal 50 is switched form the condition capable of communication with the base stations 20A, 20B and 20C (referred to as the original condition) (refer to FIG. 1) into the condition that the terminal 50 is switched into the condition capable of communication with the base stations 20B, 20C, and 20D (referred to as the condition after switching).

As shown in FIG. 6, the terminal 50 may store a base station information acquisition program 218 in the terminal first storage part 210. The base station information acquisition program 218 is a program for the terminal control part 200 to acquire the base station position information 152 and the time difference information 160 (refer to FIG. 4) from the base station A or the like. In other words, the base station information acquisition program 218 and the terminal control part 200 are as a whole an example of the base station information acquisition means.

The terminal control part 200 may acquire the base station position information 152 and the time difference information 160 (refer to FIG. 4) in the case that the above-described hand over decision program 216 decides that hand over occurs. Thereby, when the above-described condition before switching is switched to the condition after switching, positioning can be carried out on the basis of the signal S2 or the like from the base stations 20B, 20C, and 20D capable of communication after switching. The positioning method will be described later.

The terminal control part 200 may store the acquired base station position information 152 as terminal side base station position information 256 and may store the time difference information 160 as terminal side base station time difference information 258 in the terminal second storage part 250.

In addition, the terminal control part 200 may acquire the base station position information 152 and the time difference information 160 on the basis of the base station information acquisition program 218 also when a power source (not illustrated) of the terminal 50 is turned on except when the hand over occurs. The terminal control part 200 may acquire the base station position information 152 and the time difference information 160 from the base station 20A or the like capable of communication when the power source is turned on again because the terminal control part 200 cannot decide the base station 20A or the like that is capable of communication at the present if the power source of the terminal 50 is turned off.

Further, the terminal control part 200 may periodically receive the base station position information 152 and the time difference information 160 (refer to FIG. 4) on the basis of the base station information acquisition program 218 from the base station 20A or the like, for example, for every thirty minutes. Generally, in the device of generating a reference frequency for measuring time, for example, a crystal oscillator, its frequency is changed due to change of a temperature, so that a time difference shown in the time difference information 160 is also changed due to change of a temperature. In this regard, by periodically receiving the time difference information 160, it is possible to acquire the time difference information 160 after changed due to change of a temperature.

As shown in FIG. 6, the terminal 50 may store a program for deciding the number of the above satellites 220 in the terminal first storage part 210. The program for deciding the number of the above satellites 220 is a program for the terminal control part 200 to decide the number of the GPS satellites 12a and the like located above in the sky. In other words, program for deciding the number of the above satellites 220 and the terminal control part 200 are as a whole an example of the above satellite number decision means.

Specifically, the terminal control part 200 may decide the number of the GPS satellites 12a and the like that is located in the sky above the terminal 50 and can be observed at the present time measured by the terminal clock part 206 by using Almanac included in the terminal side satellite orbit information 252. Then, the terminal control part 200 may store above satellite number information 260 indicating the number of the GPS satellites 12a and the like located above in the sky in the terminal second storage part 250.

As shown in FIG. 6, the terminal 50 may store a satellite positioning program 222 in the terminal first storage part 210. The satellite positioning program 222 is a program for the terminal control part 200 to carry out positioning of the terminal 50 on the basis of the signal G1 or the like (refer to FIG. 1) from three or more GPS satellites 12a or the like. In other words, the satellite positioning program 222 and the terminal control part 200 are as a whole an example of the satellite signal positioning means.

Specifically, the terminal control part 200 may calculate a difference between a time transmitted from each GPS satellite 12a or the like and a time receiving the signal G1 or the like and further, may calculate a distance (referred to as a pseudo distance) between each GPS satellite 12a or the like and the terminal 50 on the basis of the fact that the rate of the signal G1 or the like is the speed of light. On the other hand, from Ephemeris included in the terminal side satellite orbit information 252, a position on a satellite orbit of each GPS satellite 12a or the like at the present time that is measured by the terminal clock part 206 is calculated.

Then, on the basis of the pseudo distance and the position on the satellite orbit of each GPS satellite 12a or the like, the current position is fixed.

The terminal control part 200 may store the satellite positioning position information 262 that is generated by positioning in the terminal second storage part 250.

Further, the positioning carried by the terminal control part 200 by using the satellite positioning program 222 is referred to as the satellite positioning.

As shown in FIG. 6, the terminal 50 may store a communication signal receiving program 224 in the terminal first storage part 210. The communication signal receiving program 224 is a program for the terminal control part 200 to receive the signal S1 or the like from the base station 20A or the like. In other words, the communication signal receiving program 224 and the terminal control part 200 are as a whole an example of the signal electric wave for communication receiving means.

The communication signal receiving program 224 may include a sending time information extraction program 224a. The sending time information extraction program 224a is a program for the terminal control part 200 to extract the sending time information 156 (refer to FIG. 4) from the signal S1 or the like.

The terminal control part 200 may store the extracted sending time information 156 in the terminal second storage part 250 as terminal side sending time information 264.

As shown in FIG. 6, the terminal 50 may store a receiving time information generation program 226 in the terminal first storage part 210. The receiving time information generation program 226 is a program for the terminal control part 200 to generate receiving time information 266 indicating a time receiving the signal S1 or the like. This receiving time information 266 is an example of the receiving time information and the receiving time information generation program 226 and the terminal control part 200 are as a whole an example of the receiving time information generating means.

Specifically, the terminal control part 200 may measure the time receiving the signal S1 by the terminal clock part 206 to generate the receiving time information 266.

The terminal control part 200 may store the generated receiving time information 266 in the terminal second storage part 250.

As shown in FIG. 6, the terminal 50 may store a base station positioning program 228 in the terminal first storage part 210.

The base station positioning program 228 is a program for the terminal control part 200 to position a position of the terminal 50 on the basis of the terminal side base station position information 256, the terminal side base station time difference information 258, the terminal side sending time information 264, and the receiving time information 266. In other words, the base station positioning program 228 and the terminal control part 200 are as a whole an example of the signal electric wave for communication positioning means.

Hereinafter, the positioning carried out by the terminal control part 200 by using the base station positioning program 228 is referred to as the base station positioning.

(a) to (k) in FIG. 7 are explanatory views of an example of a base station positioning method.

FIG. 7(a) is a view showing a position of each base station 20A or the like. The position of each base station 20A or the like has been known by the terminal side base station position information 256.

FIG. 7(b) is a view showing a transmission time tb01 or the like such as a signal S1 from each base station 20A or the like. Here, the transmission time tb01 or the like is an unknown number.

FIG. 7(c) is a view showing a sending time t1 or the like such as each signal S1. The sending time t1 or the like has been known by the terminal side sending time information 264. Here, since there is no time synchronization between the base stations 20A or the like, t1, t2 and t3 do not always indicate the same time.

FIG. 7(d) is a view showing a time difference ta1 or the like of each base station 20A or the like. The time difference ta1 or the like have been known from the terminal side base station time difference information 258.

FIG. 7(e) is a view showing a transmission speed of the signal S1 or the like. Since the signal S1 or the like is put on the electric wave, its transmission speed is a speed of light C.

FIG. 7(f) is a view showing a time difference td01 between the sending time t1 or the like of the signal S1 or the like and a time that the terminal 50 receives the signal S1 or the like. As shown in FIG. 7(g), the time that the terminal 50 receives the signal S1 or the like is defined as t0.

The positions of the terminal 50 (X, Y, Z) shown in FIG. 7(h) are unknown.

Relying on the assumption as described above, the equations (1) to (9) indicated in FIGS. 7(i) to (k) will be described below.

At first, since the distance between each base station 20A or the like and the terminal 50 is equal to a result of multiplication of a transmission time of the signal S1 or the like and a speed of the electric wave (the speed of light C), the equations (1) to (3) of FIG. 7(i) are formed.

Next, since the sending time t1 includes the time difference ta1 from the GPS time, the equations (4) to (6) of FIG. 7(j) are formed.

Further, with respect to the time difference td01 or the like of FIG. 7(f), the equations (7) to (9) of FIG. 7(k) are formed on the basis of the sending time t1 or the like of FIG. 7(c), the transmission time tb01 of FIG. 7(b), and the time t0 of FIG. 7(g).

In this case, since there are six unknown numbers including X, Y, Z, the transmission times tb01, tb02, and tb03 showing the position of the terminal 50, by calculating the equations (1), (2), (3), (7), (8), and (9) simultaneously, it is possible to calculate the all of the unknown numbers.

The terminal control part 200 may store abase station positioning position information 268 that is generated in this way in the terminal second storage part 250.

Further, in the above-described base station positioning, since it is based on the premise that the terminal 50 is capable of communication with the base station 20A or the like, the terminal 50 is located in a communication zone of the base station 20A or the like. Therefore, in the case that the area where the terminal 50 is located has few rough spots and the altitude components Z1 and the like of the positions of the base station 20A or the like (refer to FIG. 7(a)) are approximately equal, it is also possible to carry out the above-described base station positioning, for example, defining average values of the altitude components Z1, Z2, and Z3 as an altitude component Z of the terminal 50.

As shown in FIG. 6, the terminal 50 stores a hybrid positioning program 230 in the terminal first storage part 210. The hybrid positioning program 230 is a program for the terminal control part 200 to position a position of the terminal 50 on the basis of the signal G1 or the like, the terminal side base station position information 256, the terminal sidebase station time difference information 258, the terminal side sending time information 264, and the receiving time information 266. In other words, the hybrid positioning program 230 and the terminal control part 200 are as a whole an example of the combined positioning means.

The positioning carried out by the terminal control part 200 on the basis of the hybrid positioning program 230 is carried out according to the positioning method to be effected on the basis of the base station positioning program 228 described with reference to FIG. 7 while alternating one or two base station(s) 2A with the GPS satellite 12a or the like.

Generally, the positioning method combining two or more from among the positioning using an artificial satellite, the positioning using the mobile communication information, an acceleration sensor using a gyro or the like, and a sensor such as a car speed pulse or the like is referred to as a hybrid positioning, however, according to the present embodiment, the positioning combining the information of the base station 20A or the like and the information of the GPS satellite 12a or the like to be effected by the terminal control part 200 on the basis of the hybrid positioning program 230 is referred to as the hybrid positioning.

The terminal control part 200 may store hybrid positioning position information 270 that is generated by the hybrid positioning in the terminal second storage part 250.

As shown in FIG. 6, terminal 50 stores a positioning method selection program 232 in the terminal first storage part 210. The positioning method selection program 232 is a program for the terminal control part 200 to select any of the satellite positioning, the base station positioning, and the hybrid positioning on the basis of the number of the GPS satellites 12a and the like indicated in the above satellite number information 260. In other words, the positioning method selection program 232 and the terminal control part 200 are as a whole an example of the positioning means selection means.

Specifically, the terminal control part 200 selects the satellite positioning in the case that the number of the GPS satellites 12a and the like indicated in the above satellite number information 260 is three or more. Then, the terminal control part 200 selects the hybrid positioning in the case that the number of the GPS satellites 12a and the like indicated in the above satellite number information 260 is one or two. Further, in the case that the number of the GPS satellites 12a and the like indicated in the above satellite number information 260 is zero, the terminal control part 200 selects the base station positioning.

Generally, the positioning accuracy of the positioning based on the signal G1 or the like sent from the GPS satellite 12a or the like is higher than that of the positioning based on the signal S2 or the like for communication. For example, although the positioning error is in the range of 0 meter (m) to 400 meters (m) in the case of the satellite positioning, the positioning error is in the range of 5 meter (m) to 400 meters (m) in the case of the base station positioning.

In this regard, as long as the terminal 50 can receive the signal G1 or the like from the GPS satellite 12a or the like, the positioning of the terminal 50 can be carried out by using only the signal G1 or the like or by using the signal G1 or the like and the signal S1 or the like for communication.

Therefore, the positioning of the terminal 50 can be carried out in accordance with the number of the GPS satellites 12a and the like that can be observed at the highest degree of accuracy of positioning.

On the contrary, in the environment that three or more GPS satellites 12a and the like cannot be observed, for example, in a room, the hybrid positioning or the base station positioning can be carried out by using the signal S1 or the like for communication that can be received in the room.

As shown in FIG. 6, the terminal 50 stores a positioning position information display program 234 in the terminal first storage part 210. The positioning position information display program 234 is a program for the terminal control part 200 to display any of the satellite positioning position information 262, the base station positioning position information 268, or the hybrid positioning position information 270 on the display apparatus 64 (refer to FIG. 3).

The configuration of the positioning system 10 according to the present embodiment is as described above. The operational examples thereof will be described mainly with reference to FIG. 8.

Figure 8:
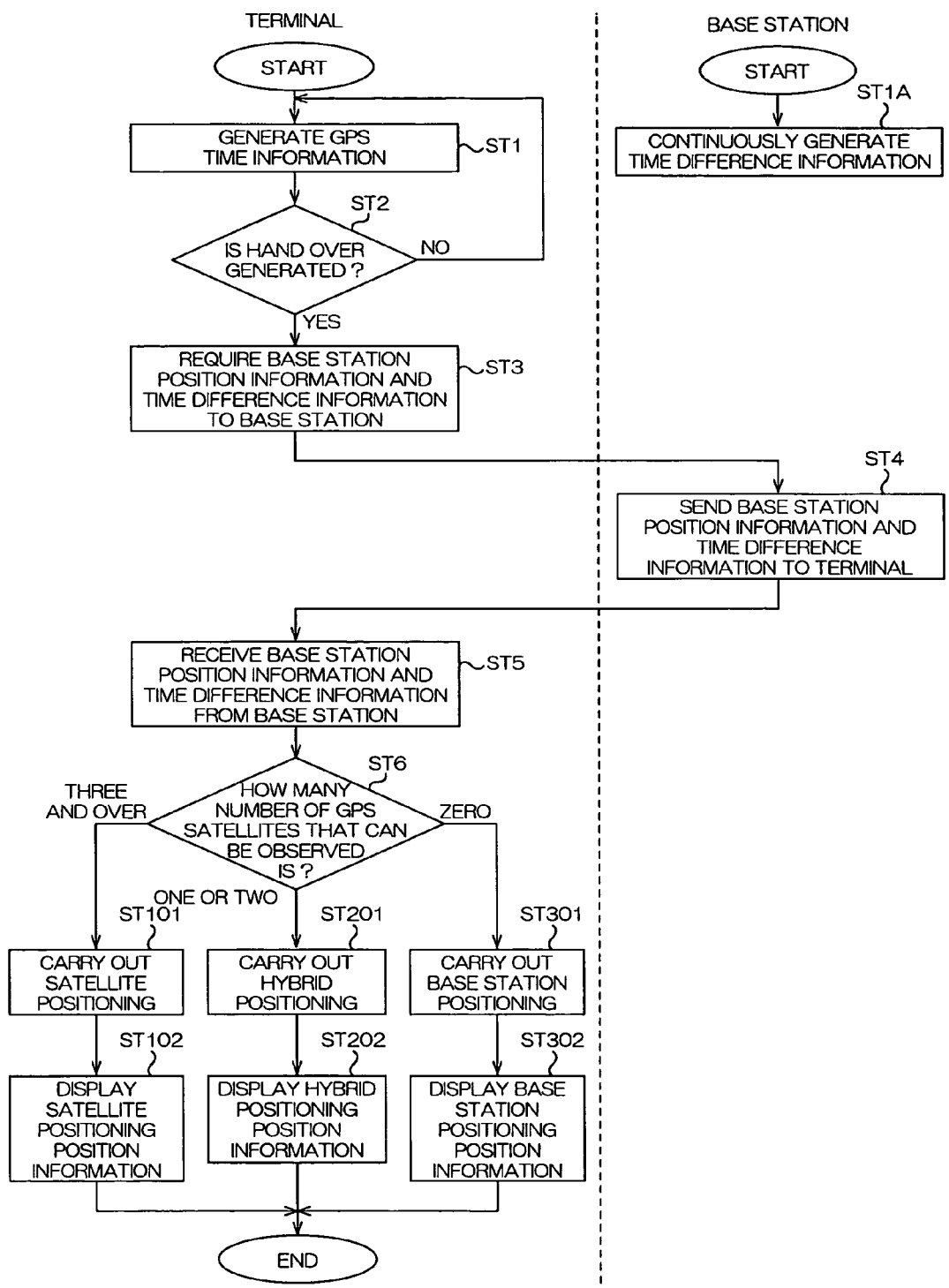
FIG. 8 is a schematic flowchart showing the operational example of the positioning system.

FIG. 8 is a schematic flowchart showing the operational example of the positioning system 10 according to the present embodiment.

Relying on the assumption that the terminal 50 is switched from the condition it can not communicate with the base stations 20A, 20B, and 20C into the condition that it is capable of communication with them, the explanation will be given below.

At first, the terminal 50 may generate the terminal side GPS time information 254 (refer to FIG. 6) (step S1 of FIG. 8). This step ST1 is an example of the step of generating the terminal side satellite time information. By correcting a time of the terminal clock part 206 (refer to FIG. 6) on the basis of the terminal side GPS time information 254, it is possible to eliminate a difference from the GPS time.

On the other hand, the base station 20A or the like may continuously generate the time difference information 160 (refer to FIG. 4) (step ST1A of FIG. 8).

Subsequently, the terminal 50 may decide if the hand over occurs or not (step ST2).

If the terminal 50 decides that the hand over occurs, it may require the base station position information 152 and the time difference information 160 (refer to FIG. 4) from the base station 20A or the like capable of communication therewith (step ST3).

Receiving the request from the terminal 50, the base station 20A or the like may send the base station position information 152 and the time difference information 160 to the terminal 50 (step ST4).

Subsequently, the terminal 50 may receive the base station position information 152 and the time difference information 160 from the base station 20A or the like (step ST5). This step ST5 is an example of the step of receiving base station information.

Subsequently, the terminal 50 may decide the number of the GPS satellites 12*a* and the like that can be observed and are located in the sky above the terminal 50 (step ST6). This step ST6 is an example of the step of deciding a number of above satellites.

The terminal 50 may carry out the satellite positioning when deciding that the number of the GPS satellites 12*a* and the like that can be observed is three or more (step ST101) to generate the satellite positioning position information 262 (refer to FIG. 6). This step ST101 is an example of the step of selecting positioning means.

Then, the terminal 50 may display the satellite positioning position information 262 on the display apparatus 64 (refer to FIG. 3) (step ST102).

In the step ST6, deciding that the number of the GPS satellites 12*a* and the like that can be observed is one or two, the terminal 50 may carry out the hybrid positioning (step ST201) and may generate the hybrid positioning position information 270 (refer to FIG. 6). This step ST201 is also an example of the step of selecting positioning means.

Then, the terminal 50 may display the hybrid positioning position information 270 on the display apparatus 64 (refer to FIG. 3) (step ST202).

In the step ST6, deciding that the number of the GPS satellites 12*a* and the like that can be observed is zero, the terminal 50 may carry out the base station positioning (step ST301) and may generate the base station positioning position information 268 (refer to FIG. 6). This step ST301 is also an example of the step of positioning means.

Then, the terminal 50 may display the base station positioning position information 268 on the display apparatus 64 (refer to FIG. 3) (step ST302).

As described above, according to the positioning system 10, without requiring the large-scale system change of the communication base station, it is possible to position the terminal device even in the case that the signal cannot be received from three or more communication base stations.

With respect to a computer and a computer readable recording medium or the like

The program can be made into a control program of the terminal device for a computer to execute the steps of: generating terminal side satellite time information, receiving base station information, deciding a number of above satellites, and selecting positioning means and the like.

In addition, this computer readable recording medium also can be made into one that records a control program or the like of such a terminal device therein.

A program storage medium to be used for installing the control program or the like of the terminal device or the like in the computer and making it so as to be executed by the computer can be realized, for example, not only by a package media such as a flexible disk such as a floppy (registered trademark) and a CD-ROM (Compact Disc Read Only Memory), a CD-R (Compact Disc-Recordable), a CD-RW (Compact Disc-Rewritable), and a DVD (Digital Versatile Disc) or the like but also by a semiconductor memory, a magnetic disk or a magnetic optical disk for temporally or permanently storing the program therein.

The present invention is not limited to the above-described respective embodiments. Further, the above-described respective embodiments may be combined with each other.

What is claimed is:

1. A positioning system of an inter-communication base station asynchronous system comprising:
   a plurality of communication base stations; and
   a terminal device capable of communication with the communication base stations,
   each of the communication base stations including
      a base station clock that is not synchronized between the communication base stations and the terminal device,
      a time difference information generating section that receives a satellite signal from a positioning satellite and generates time difference information indicating a time difference between a satellite time and the base station clock, the satellite time being a time of the positioning satellite,
      a signal electric wave for communication sending section that sends a signal electric wave for communication to the terminal device, the signal electric wave for communication including a sending time measured by the base station clock, and
      a base station information sending section that sends the base station position information and the time difference information to the terminal device, the base station position information indicating a position of the communication base station,
   the terminal device including
      a terminal clock that receives the satellite signal from the positioning satellite and measures a time that is synchronized with the satellite time that is the time of positioning satellite,
      a satellite positioning section that receives the satellite signal from the positioning satellite and positions a position of the terminal device by calculating a pseudo distance between the positioning satellite and the terminal device on the basis of the satellite signal that has been received,
      a base station information acquisition section that acquires the base station position information and the time difference information from the communication base station,
      a base station positioning section that receives the signal electric wave for communication including the sending time measured by the base station clock of the communication base station from the communication base station, and positions the position of the terminal device by calculating a distance between the communication base station and the terminal device on the basis of a reception time measured by the terminal clock when receiving the signal electric wave for communication, the sending time, and the base station position information and the time difference information acquired by the base station information acquisition section,
      a combined positioning section that receives the satellite signal from the positioning satellite and positions the position of the terminal device by calculating the pseudo distance between the positioning satellite and the terminal device on the basis of the satellite signal that has been received, receives the signal electric wave for communication including the sending time measured by the base station clock of the communication base station from the communication base station, and positions the position of the terminal device by calculating the distance between the communication base station and the terminal device on the basis of a reception time measured by the terminal clock when receiving the signal electric wave for communication, the sending time, and the base station position information and the time difference information acquired by the base station information acquisition section, and positions the position of the terminal device using the pseudo distance and the distance, above satellite number decision section that decides a number of above satellites that are the positioning satellites located in the sky above the terminal device, and a positioning section selection section that selects any of the satellite signal positioning section, the base station positioning section, and the combined positioning section on the basis of the number of the above satellites decided by the above satellite number decision section.

2. A terminal device that is capable of receiving signal electric wave for communication from a plurality of communication base stations, each of the communication base stations including a base station clock that is not synchronized between the communication base stations and a time difference information generating section that receives a satellite signal from a positioning satellite and generates time difference information that indicates a time difference between a satellite time and the base station clock that is not synchronized between the communication base stations, the satellite time being a time of the positioning satellite, the signal electric wave for communication including a sending time measured by the base station clock, the terminal device comprising:

a terminal clock that receives the satellite signal from the positioning satellite and measures a time that is synchronized with the satellite time that is the time of positioning satellite;

a satellite positioning section that receives the satellite signal from the positioning satellite and positions a position of the terminal device by calculating a pseudo distance between the positioning satellite and the terminal device on the basis of the satellite signal that has been received;

a base station information acquisition section that acquires base station position information and time difference information from the communication base station, the time difference information indicating a time difference between the satellite time and the base station clock;

a base station positioning section that receives the signal electric wave for communication including the sending time measured by the base station clock of the communication base station from the communication base station, and positions the position of the terminal device by calculating a distance between the communication base station and the terminal device on the basis of a reception time measured by the terminal clock when receiving the signal electric wave for communication, the sending time, and the base station position information and the time difference information acquired by the base station information acquisition section;

a combined positioning section that receives the satellite signal from the positioning satellite and positions the position of the terminal device by calculating the pseudo distance between the positioning satellite and the terminal device on the basis of the satellite signal that has been received, receives the signal electric wave for communication including the sending time measured by the base station clock of the communication base station from the communication base station, and positions the position of the terminal device by calculating the distance between the communication base station and the terminal device on the basis of a reception time measured by the terminal clock when receiving the signal electric wave for communication, the sending time, and the base station position information and the time difference information acquired by the base station information acquisition section, and positions the position of the terminal device using the pseudo distance and the distance;

above satellite number section that decides a number of above satellites that are the positioning satellites located in the sky above the terminal device; and a positioning section selection section that selects for selecting any of the satellite signal positioning section, and the combined positioning section on the basis of the number of the above satellites decided by the above satellite number decision section.

3. The terminal device according to claim 2, wherein the positioning section selection section selects the satellite signal positioning section when the number of the above satellites is three or more, selects the combined positioning section when the number of the above satellites is one or two, and selects the signal electric wave for communication positioning section when the number of the above satellites is zero.

4. The terminal device according to claim 2 or claim 3, further comprising a base station switching decision section that decides if the all or a part of the communication base stations capable of communication are or is switched, wherein the base station information acquisition section acquires the base station position information and the time difference information on the basis of a decision result of the base station switching decision section.

5. A control method of a terminal device that is capable of receiving a signal electric wave for communication from a plurality of communication base stations, each of the communication base stations including a base station clock that is not synchronized between the communication base stations and a time difference information generating section that receives a satellite signal from a positioning satellite and generates time difference information that indicates a time difference between a satellite time and the base station clock, the satellite time being a time of the positioning satellite, the signal electric wave for communication including a sending time measured by the base station click, the method comprising, controlling a terminal clock to receive the satellite signal from the positioning satellite and measure a time that is synchronized with the satellite time that is the time of the positioning satellite;

receiving base station position information and time difference information indicating a time difference between the satellite time and the base station clock from the communication base station, the base station position information indicating a position of the communication base station, the base station clock not synchronized between the communication base stations;

deciding a number of the above satellites that are the positioning satellites located in the sky above the terminal device; and selecting one from among a satellite signal positioning section, a satellite positioning section, and a combined positioning section, the satellite positioning section that receives the satellite signal from the positioning satellites and positions a position of the terminal device by calculating a pseudo distance between the positioning satellite and the terminal device on the basis of the satellite signal that has been received, the satellite positioning section that receives the satellite signal from the positioning satellite and positions a position of the terminal device by calculating a pseudo distance between the positioning satellite and the terminal device on the basis of the satellite signal that has been received, the combined positioning section that receives the satellite signal from the positioning satellite and positions the position of the terminal device by calculating the pseudo distance between the positioning satellite and the terminal device on the basis of the satellite signal that has been received, receives the signal electric wave for communication including the sending time measured by the base station clock of the communication base station from the communication bases station, and positions the position of the terminal device by calculating the distance between the communication base station and the terminal device on the basis of a reception time measured by the terminal clock when receiving the signal electric wave for communication, the sending time, and the base station position information and the time difference information acquired by the base station information acquisition section, and positions the position of the terminal device using the pseudo distance and the distance on the basis of the number of the above satellites, and positioning the position of the terminal device.

6. A control program of a computer included in a terminal device that is capable of receiving a signal electric wave for communication from a plurality of communication base stations, each of the communication base stations including a base station clock that is not synchronized between the communication base stations and a time difference information generating section that receives a satellite signal from a positioning satellite and generates time difference information that indicates a time difference between a satellite time and the base station clock, the satellite time being a time of the positioning satellite, the signal electric wave for communication including a sending time measured by the base station clock, the control program causing the computer to execute instructions comprising:

controlling a terminal clock to receive the satellite signal from the positioning satellite and measure a time that is synchronized with the satellite time that is the time of the positioning satellite;

receiving base station position information and time difference information from the communication base station, the base station position information indicating a position of the communication base station, the time difference information time difference information that indicating a time difference between the satellite time and the base station clock;

deciding a number of above satellites that are the positioning satellite located in the sky above the terminal device; and selecting one from among a satellite signal positioning section, a satellite positioning section, and a combined positioning section, the satellite positioning section that receives the satellite signal from the positioning satellites and positions a position of the terminal device by calculating a pseudo distance between the positioning satellite and the terminal device on the basis of the satellite signal that has been received, the satellite positioning section that receives the satellite signal from the positioning satellite and positions a position of the terminal device by calculating a pseudo distance between the positioning satellite and the terminal device on the basis of the satellite signal that has been received, the combined positioning section that receives the satellite signal from the positioning satellite and positions the position of the terminal device by calculating the pseudo distance between the positioning satellite and the terminal device on the basis of the satellite signal that has been received, receives the signal electric wave for communication including the sending time measured by the base station clock of the communication base station from the communication bases station, and positions the position of the terminal device by calculating the distance between the communication base station and the terminal device on the basis of a reception time measured by the terminal clock when receiving the signal electric wave for communication, the sending time, and the base station position information and the time difference information acquired by the base station information acquisition section, and positions the position of the terminal device using the pseudo distance and the distance on the basis of the number of the above satellites, and positioning the position of the terminal device, the base station clock not synchronized between the communication base stations.

7. A computer readable recording medium recording a control program of a terminal device that includes a computer and is capable of receiving a signal elective wave for communication from a plurality of communication base stations, each of the communication base stations including a base station clock that is not synchronized between the communication base stations and a time difference information generating section that receives a satellite signal from a positioning satellite and generates time difference information that indicates a time difference between a satellite time and the base station click, the satellite time being a time of the positioning satellite, the signal electric wave for communication including a sending time measured by the base station click, the control program comprising:

code for controlling a terminal clock to receive the satellite signal from the positioning satellite and measure a time that is synchronized with the satellite time that is the time of the positioning satellite;

code for receiving base station position information and time difference information from the communication base station, the communication base station information indicating a position of the communication base station, the time difference information indicating a time difference between the satellite time and the base station clock not synchronized between the communication base stations, the time difference information indicating a time difference between the satellite time and the base station clock;

code for deciding a number of above satellites that are the positioning satellites located in the sky above the terminal device; and code for selecting one from among a satellite signal positioning section, a satellite positioning section, and a combined positioning section, the satellite positioning section that receives the satellite signal from the positioning satellites and positions a position of the terminal device by calculating a pseudo distance between the positioning satellite and the terminal device on the basis of the satellite signal that has been received, the satellite positioning section that receives the satellite signal from the positioning satellite and positions a position of the terminal device by calculating a pseudo distance between the positioning satellite and the terminal device on the basis of the satellite signal that has been received, the combined positioning section that receives the satellite signal from the positioning satellite and positions the position of the terminal device by calculating the pseudo distance between the positioning satellite and the terminal device on the basis of the satellite signal that has been received, receives the signal electric wave for communication including the sending time measured by the base station clock of the communication base station from the communication bases station, and positions the position of the terminal device by calculating the distance between the communication base station and the terminal device on the basis of a reception time measured by the terminal clock when receiving the signal electric wave for communication, the sending time, and the base station position information and the time difference information acquired by the base station information acquisition section, and positions the position of the terminal device using the pseudo distance and the distance on the basis of the number of the above satellites, and positioning the position of the terminal device.

* * * * *

UNITED STATES PATENT AND TRADEMARK OFFICE
CERTIFICATE OF CORRECTION

PATENT NO. : 7,409,187 B2  Page 1 of 1
APPLICATION NO. : 11/346202
DATED : August 5, 2008
INVENTOR(S) : Seiichi Taniguchi It is certified that error appears in the above-identified patent and that said Letters Patent is hereby corrected as shown below:

On the Title Page:

Please insert on the cover sheet, in the left column between items (65) and (51), --(30) Foreign Application Priority Data: February 4, 2005 (JP)   JP2005-029422--

In Item (74), "Attorney, Agent, or Firm - Gerald IP Counselors, LLP" should read --Attorney, Agent, or Firm - Global IP Counselors, LLP--

Signed and Sealed this

Eighteenth Day of November, 2008

JON W. DUDAS
*Director of the United States Patent and Trademark Office*